United States Patent
Ohtsuki (10) Patent No.: US 6,198,934 B1
(45) Date of Patent: Mar. 6, 2001

(54) METHOD OF JUDGING WHETHER RADIO RECEIVER IS INSIDE OR OUTSIDE SERVICE AREA, CIRCUIT FOR JUDGING THE SAME, AND RADIO SELECTIVE-CALLING RECEIVER INCLUDING THE CIRCUIT

(75) Inventor: Michihito Ohtsuki, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/185,949

(22) Filed: Nov. 4, 1998

(30) Foreign Application Priority Data

Nov. 4, 1997 (JP) .................................................. 9-317642

(51) Int. Cl.$^7$ ...................................................... H04Q 7/20
(52) U.S. Cl. .......................... 455/456; 455/421; 455/434
(58) Field of Search .................................... 455/132, 134, 455/140, 161.1, 161.2, 161.3, 421, 422, 434, 456, 517, 525, 526, 226.2, 150.1, 32.1; 340/825.44, 825.49, 825.36; 342/450, 457

(56) References Cited

U.S. PATENT DOCUMENTS

| | | | |
|---|---|---|---|
| 4,675,656 | * | 6/1987 | Narcisse ................................ 340/539 |
| 4,891,638 | * | 1/1990 | Davis ................................ 340/825.44 |
| 5,193,216 | * | 3/1993 | Davis ................................ 455/67.7 |
| 5,386,588 | * | 1/1995 | Yasuda ................................ 455/423 |
| 5,396,230 | * | 3/1995 | Motegi ............................ 340/825.44 |
| 5,406,275 | * | 4/1995 | Hassett et al. ........................ 340/933 |
| 5,551,061 | * | 8/1996 | Schwendwman ..................... 455/457 |
| 5,977,881 | * | 11/1999 | Kido ................................ 340/825.44 |
| 6,034,620 | * | 3/2000 | Ikka ................................ 340/825.44 |

FOREIGN PATENT DOCUMENTS

| | | |
|---|---|---|
| 40226617 | * 10/1989 | (JP) . |
| 6-315001 | 11/1994 | (JP) . |
| 2626504 | 4/1997 | (JP) . |
| 10-51833 | 2/1998 | (JP) . |
| 10-66116 | 3/1998 | (JP) . |

* cited by examiner

Primary Examiner—Edward F. Urban
Assistant Examiner—Congvan Tran
(74) Attorney, Agent, or Firm—Scully, Scott, Murphy & Presser (57) ABSTRACT

There is provided a method of judging whether a radio receiver is in a first area or a second area, the radio receiver dealing with a plurality of frequency channels, the method including the steps, in sequence, of receiving radio signals, detecting a synchronization signal out of the received radio signals, and transmitting a first signal, judging whether the radio receiver transfers outside a range where transmitted radio signals can be received, based on the first signal, detecting an intensity of electro-magnetic wave for each of the frequency channels, when the radio receiver is judged to transfer outside the range, and judging that the radio receiver is situated in the first area, when all of intensities of electro-magnetic waves are smaller than a threshold value, and judging that the radio receiver is situated in the second area, when at least one of intensities of electro-magnetic waves is greater than the threshold value. In accordance with the method, it is possible to accurately judge whether a radio receiver is situated in a first area such as an area to which radio is interrupted to enter, or in a second area such as an area other than a service area where transmitted radio signal can be received.

44 Claims, 6 Drawing Sheets

METHOD OF JUDGING WHETHER RADIO RECEIVER IS INSIDE OR OUTSIDE SERVICE AREA, CIRCUIT FOR JUDGING THE SAME, AND RADIO SELECTIVE-CALLING RECEIVER INCLUDING THE CIRCUIT

BACKGROUND OF THE INVENTION

1. Field of the Invention

The invention relates to a method of judging whether a radio receiver is situated in which area, a circuit for judging the same, and a radio selective-calling receiver including the circuit, and more particularly to such a method, a circuit, and a radio selective-calling receiver to be used in a radio selective-calling system including a plurality of radio frequency channels having different radio frequencies.

2. Description of the Related Art

In these days, there has been increased a demand for a radio selective-calling receiver (hereinafter, referred to as "scanning receiver") having a plurality of frequencies through which a calling number of the radio selective-calling receiver is transmitted. Such a scanning receiver is used as a multi-area type receiver which automatically switches a plurality of areas having different frequencies. In a scanning receiver, since a calling number of the receiver is transmitted through a plurality of frequencies, a transmitted signal to be received is searched as the frequencies are scanned, when the scanning receiver is without a wireless range.

When a synchronization signal has been received, it is stopped to scan frequencies. Then, a certain frequency is fixed to thereby put the scanning receiver in a condition for receiving its calling number, that is, in an in-range condition. Once the scanning receiver has been transferred into an in-range condition, the certain frequency is kept fixed until requirements for transferring to an out-range condition are satisfied. Namely, a scanning receiver has a fixed frequency in an in-range condition, and after transferring to an out-range condition, a scanning receiver ceases synchronization operation having been conducted with transmitted signals in an in-range condition, and detects a synchronization signal with frequencies being switched. Thus, there is accomplished automatic selection in multi-areas.

For instance, Japanese Unexamined Patent Publication No. 6-315001 having been published on Nov. 8, 1994 has suggested such automatic multi-area selection wherein frequencies are scanned in a predetermined pattern in an in-range condition.

An operation for an out-range condition usually starts when a synchronization signal is not received a predetermined number of times, or when a synchronization signal is not received by a certain period of time.

The above-mentioned scanning receiver cannot concurrently a plurality of frequencies at a time, an interval for searching a synchronization signal at a certain frequency cannot avoid becoming longer in proportion to the number of scanning frequencies. That is, as the number of frequencies to be searched increases, it would take much time to detect a synchronization signal, even if the scanning receiver is situated within an area in which transmitted signals can be received. This is accompanied with a problem that it takes much time to transfer an out-range operation to an in-range operation.

As a solution to this problem, Japanese Unexamined Patent Publication No. 6-244777 having been published on Sep. 2, 1994 and having been patented as Japanese Patent No. 2626504 on Apr. 11, 1997, has suggested a radio selective-calling receiver where an electric field is detected when a synchronization signal is searched, to thereby shorten time necessary for searching a lot of frequencies.

On the other hand, considering battery saving, there is another problem. If battery saving is taken precedence over detection of a synchronization signal, it is delayed to detect a synchronization signal, because battery saving would need much time. To the contrary, if synchronization is intended to promptly re-established, there would be caused a problem of poor battery saving.

When a radio selective-calling receiver is situated in an area to which radio is interrupted to enter, such as a tunnel, it would be frequently preferable to promptly re-establish synchronization rather than carry out battery saving. To the contrary, when a radio selective-calling receiver is situated in an area other than a service area where transmitted radio signal can be received, it would be preferable to carry out battery saving rather than re-establish synchronization.

Thus, if an out-range condition is defined to include both the above-mentioned area to which radio is interrupted to enter, such as a tunnel and an underground market, and the above-mentioned area other than an area where transmitted radio signal can be received, such as an area other than a service area, it would be quite difficult or almost impossible to concurrently satisfy prompt battery saving and establishment of synchronization at a time.

In view of such a problem, Japanese Patent Applications Nos. 8-203958 and 8-215697 have suggested a radio selective-calling receiver capable of promptly re-establishing synchronization with battery saving being taken precedence, taking the above-mentioned two areas into consideration.

The radio selective-calling receiver suggested in the above-mentioned Japanese Unexamined Patent Publication No. 6-244777 can surely shorten a period of time necessary for searching a lot of frequencies, but is accompanied with a problem that it is impossible to concurrently satisfy battery saving and prompt re-establishment of synchronization, if an out-range condition is defined to include both an area to which radio is interrupted to enter, such as a tunnel and an underground market, and an area other than an area where transmitted radio signal can be received, such as an area other than a service area.

The radio selective-calling receivers suggested in the above-mentioned Japanese Patent Applications Nos. 8-203958 and 8-215697 can concurrently satisfy battery saving and re-establishment of synchronization, if it is possible to accurately judge whether the radio selective-calling receiver is in an area to which radio is interrupted to enter, such as a tunnel and an underground market, or an area other than an area where transmitted radio signal can be received, such as an area other than a service area.

The above-mentioned radio selective-calling receivers can judge they are situated in an area to which radio is interrupted to enter, such as a tunnel and an underground market, if they promptly enter the area. However, if they gradually enter the area, it would be quite difficult for them to judge whether they are located in the area or an area other than an area where transmitted radio signal can be received, such as an area other than a service area. As a result, the above-mentioned radio selective-calling receivers frequently misjudge that they are situated in an area other than an area where transmitted radio signal can be received, such as an area other than a service area.

SUMMARY OF THE INVENTION

In view of the above-mentioned problems of the conventional radio selective-calling receivers, it is an object of the present invention to provide a radio selective-calling receiver capable of concurrently satisfying battery saving and prompt establishment of synchronization, and accurately judging whether it is situated in an area to which radio is interrupted to enter, such as a tunnel and an underground market, or an area other than an area where transmitted radio signal can be received, such as an area other than a service area.

In one aspect, there is provided a method of judging whether a radio receiver is in a first area or a second area, the radio receiver dealing with a plurality of frequency channels, the method including the steps, in sequence, of (a) receiving and demodulating radio signals, (b) detecting a synchronization signal out of the thus demodulated radio signals, and transmitting a first signal, (c) judging whether the radio receiver transfers outside a range where transmitted radio signals can be received, based on the first signal detected in the step (b), (d) detecting an intensity of electro-magnetic wave for each of the frequency channels, when the radio receiver is judged to transfer outside the range, and (e) judging that the radio receiver is situated in the first area, when all of intensities of electro-magnetic waves are equal to or smaller than a predetermined threshold value, and judging that the radio receiver is situated in the second area, when at least one of intensities of electro-magnetic waves is equal to or greater than the predetermined threshold value.

For instance, the first area is an area to which radio is interrupted to enter, and the second area is an area other than an area where transmitted radio signal can be received.

The method may further include the step of (f) searching a synchronization signal suitable for the first area, when the radio receiver is judged to be situated in the first area in the step (e). The method may further include the step of (g) searching a synchronization signal suitable for the second area, when the radio receiver is judged to be situated in the second area in the step (e).

It is preferable that the synchronization signal is searched with predetermined frequency channels being switched and further with radio signals being received at an interval longer than an interval determined for battery saving.

It is preferable that the steps (e) and (f) are carried out on receiving an external input, in which case, it is preferable that the method further includes the step of storing the external input. Similarly, it is preferable that the steps (e) and (g) are carried out on receiving an external input, in which case, it is preferable that the method further includes the step of storing the external input.

It is preferable that the radio receiver is judged to be situated within the range, when the synchronization signal is detected, and is judged to be situated outside the range, when the synchronization signal is not detected successively a predetermined number of times. As an alternative, the radio receiver may be judged to be situated within the range, when the synchronization signal is detected, and is judged to be situated outside the range, when the synchronization signal is not detected by a predetermined period of time.

It is preferable that the method further includes the steps of (h) storing data about the intensity of electro-magnetic wave, and (i) judging whether the radio receiver is situated in the first area or the second area, and determining an operation of the radio receiver, based on the data.

It is preferable that the plurality of frequency channels are changed or determined in dependence on frequency channels obtained when the radio receiver transfers outside the range.

There is further provided a method of judging whether a radio receiver is in a first area or a second area, the radio receiver dealing with a plurality of frequency channels, the method including the steps, in sequence, of (a) receiving and demodulating radio signals, (b) detecting a synchronization signal out of the thus demodulated radio signals, and transmitting a first signal, (c) judging whether the radio receiver transfers outside a range where transmitted radio signals can be received, based on the first signal detected in the step (b), (d) detecting an intensity of electro-magnetic wave for each of the frequency channels, when the radio receiver is judged to transfer outside the range, (e) judging that the radio receiver is situated in the first area, when all of intensities of electro-magnetic waves are equal to or smaller than a predetermined threshold value, and judging that the radio receiver is situated in the second area, when at least one of intensities of electro-magnetic waves is equal to or greater than the predetermined threshold value, (f) detecting an intensity of electro-magnetic wave, and (g) searching a synchronization signal suitable for the first or second area, when the radio receiver is judged to be situated in the first or second area in the step (e).

In another aspect, there is provided a circuit for judging whether a radio receiver is in a first area or a second area, the radio receiver dealing with a plurality of frequency channels, the circuit including (a) a radio receiver for receiving and demodulating radio signals, (b) a first detector for detecting a synchronization signal out of the thus demodulated radio signals, and transmitting a first signal, (c) a monitor for judging whether the radio receiver transfers outside a range where transmitted radio signals can be received, based on the first signal transmitted from the first detector, (d) a second detector for detecting an intensity of electro-magnetic wave for each of the frequency channels, when the radio receiver is judged to transfer outside the range, and (e) a controller for judging that the radio receiver is situated in the first area, when all of intensities of electro-magnetic waves are equal to or smaller than a predetermined threshold value, and judging that the radio receiver is situated in the second area, when at least one of intensities of electro-magnetic waves is equal to or greater than the predetermined threshold value.

For instance, the radio receiver searches a synchronization signal suitable for the first area, when the radio receiver is judged to be situated in the first area, and the receiver searches a synchronization signal suitable for the second area, when the radio receiver is judged to be situated in the second area.

It is preferable that the circuit further includes a switch for providing an external input to the radio receiver for causing the radio receiver to judge whether the radio receiver is in the first or second area.

It is preferable that the monitor judges that the radio receiver is situated within the range, when the synchronization signal is detected, and that the radio receiver is situated outside the range, when the synchronization signal is not detected successively a predetermined number of times. It is also preferable that the monitor judges that the radio receiver is situated within the range, when the synchronization signal is detected, and that the radio receiver is situated outside the range, when the synchronization signal is not detected by a predetermined period of time.

The circuit may further include a memory for storing data about an intensity of electro-magnetic wave, transmitted from the second detector, and wherein the controller judges whether the radio receiver is situated in the first area or the second area, and determining an operation of the radio receiver, based on the data.

For instance, there may be employed an electrically erasable programmable read only memory (EEPROM) as the memory.

There is further provided a radio selective-calling receiver dealing with a plurality of frequency channels, comprising the above-mentioned circuit.

The advantages obtained by the aforementioned present invention will be described hereinbelow.

In accordance with the present invention, there is determined a threshold intensity of electro-magnetic waves. If a detected intensity of an electric field is greater than the threshold intensity, a radio selective-calling receiver is judged to be situated in an area other than an area where transmitted radio signals can be received, whereas if a detected intensity of an electric field is smaller than the threshold intensity, a radio selective-calling receiver is judged to be situated in an area where radio signals are interrupted to enter. Hence, it is possible to judge whether the radio selective-calling receiver is situated in whether an area other than an area where transmitted radio signals can be received, such as an area other than a service area, or an area where radio signals are interrupted to enter, such as a tunnel or an underground market.

In accordance with the present invention, if one of intensities of an electric field is greater than the threshold intensity, a synchronization signal is searched with predetermined frequency channels being switched and further with radio signals being received at an intermittent interval longer than an interval determined for battery saving.

As a result, the present invention makes it possible to concurrently satisfy battery saving and prompt establishment of synchronization, and accurately judge whether it is situated in an area to which radio is interrupted to enter, such as a tunnel and an underground market, or an area other than an area where transmitted radio signal can be received, such as an area other than a service area.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

First Embodiment

Figure 1:
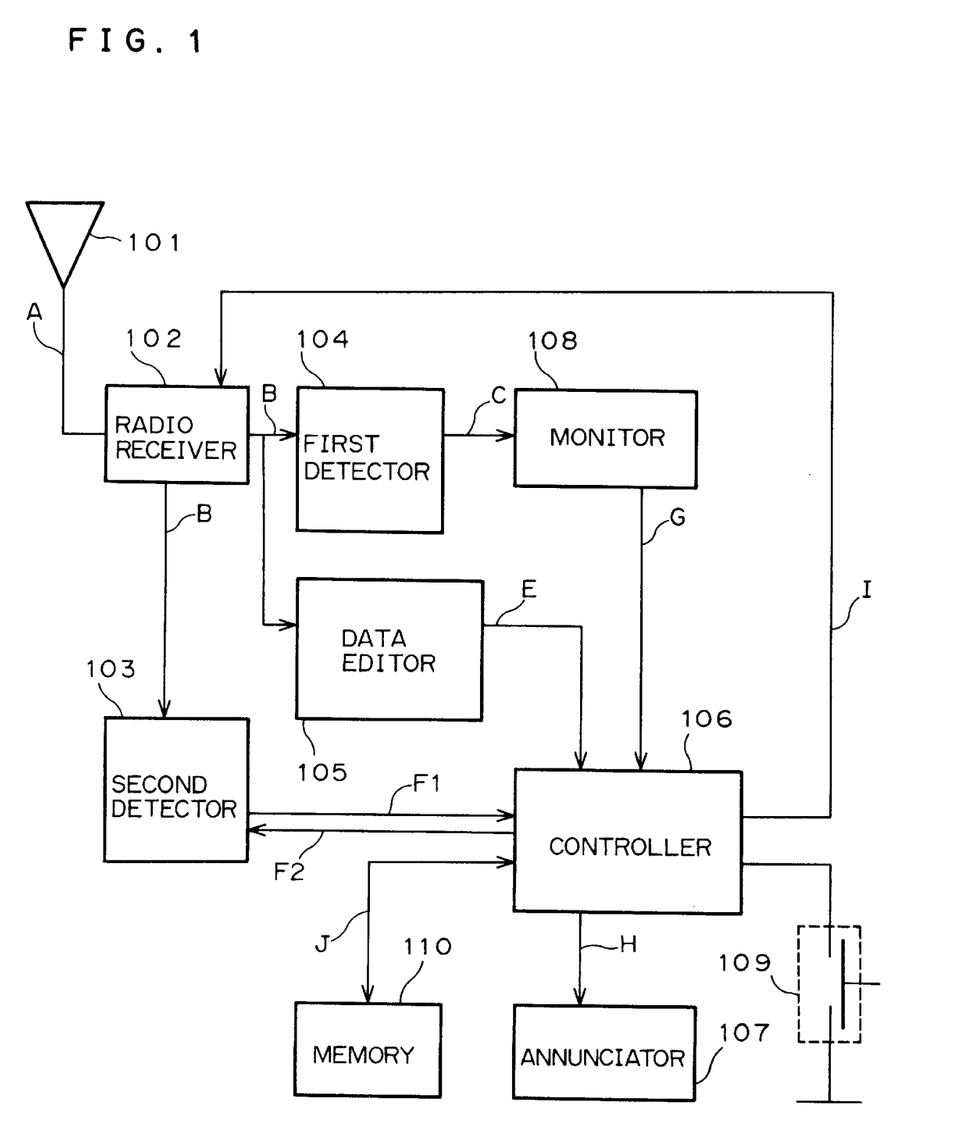
FIG. 1 is a block diagram of a radio selective-calling receiver in accordance with the first embodiment.

FIG. 1 is a block diagram of a radio selective-calling receiver in accordance with the first embodiment. The illustrated radio selective-calling receiver is comprised of an antenna 101 conducting radio communication with a base station (not illustrated), and transmitting a received radio signal A, a radio receiver 102 amplifying and demodulating the radio signal A transmitted from the antenna 101, and outputting a demodulated signal B, a first detector 104 receiving the demodulated signal B, detecting a synchronization signal out of the demodulated signal B, and transmitting a detection signal C, a second detector 103 receiving the demodulated signal B, detecting an intensity of an electric field of received frequencies, and transmitting a detection signal F1, a data editor 106 receiving the demodulated signal B, and transmitting a data signal E representing received data, in accordance with sampling clocks, a monitor 108 receiving the detection signal C, judging whether the radio selective-calling receiver is located in an in-range area where radio signals can be received or in an out-range area where radio signals cannot be received, and transmitting a location signal G indicating that the radio selective-calling receiver is located in whether an in-range area or an out-range area, a controller 106 actuating an annunciator 107 when the data signal E includes a calling number of the radio selective-calling receiver, and judging that the radio receiver is situated in an area to which radio is interrupted to enter, or an area other than an area where transmitted radio signal can be received, based on the location signal transmitted from the monitor 108 and the detection signal F1 transmitted from the second detector 103, a push switch 109 providing an external input to the controller 106 to thereby cause the controller 106 to make a judgement, a memory 110 storing the external input and data about frequency channels, and an annunciator 107 for annunciating an owner of the radio selective-calling receiver that the radio selective-calling receiver receives a call by making sound, displaying letters or numerals, making oscillation, and so on, alone or in combination.

Herein, the term "in-range area" indicates an area where a radio selective-calling receiver can receive radio signals, and the term "out-range area" indicates an area where a radio selective-calling receiver cannot receive radio signals. The out-range area includes an area to which radio is interrupted to enter, such as a tunnel or an underground market, and an area other than an area where transmitted radio signal can be received, such as an area other than a service area which is covered by a radio base station. Hereinafter, the former area is referred to simply as a first area, and the latter area is referred to simply as a second area.

The radio selective-calling receiver having the above-mentioned structure operates as follows.

When the antenna 101 receives radio signals transmitted from a radio base station, the radio receiver 102 amplifies and demodulates the thus received radio signals A, and transmits the demodulated signal B. Then, the data editor 105 samples the demodulated signal B, and transmits the data signal E to the controller 106.

If the data signal E includes a calling number of the radio selective-calling receiver, the controller 106 an actuation signal H to the annunciator 107 to thereby actuate the annunciator 107. The annunciator 107 annunciates an owner of the radio selective-calling receiver that the radio selective-calling receiver receives a call, by making sound, displaying letters or numerals, or making oscillation.

The first detector 104 samples the demodulated signal B transmitted from the radio receiver 102, detects a synchronization signal pattern, and transmits the detection signal C to the monitor 108.

The monitor 108 detects whether a synchronization signal is included in the detection signal C. If a synchronization signal is detected, the monitor 108 transmits the location signal G indicating that the radio selective-calling receiver is located in an in-range area, to the controller 106. To the contrary, if a synchronization signal is not detected N times in sequence, the monitor 108 transmits the location signal G indicating that the radio selective-calling receiver is located in an out-range area, to the controller 106. The numeral N is predetermined, and is one of parameters for judging whether the radio selective-calling receiver transfers into an out-range area.

Then, the controller 106 transmits the actuation signal H to the annunciator 107 to thereby actuate the annunciator 107. The controller 106 judges whether the radio selective-calling receiver is located in an in-range area or out-range area based on the location signal G transmitted from the monitor 108. If the radio selective-calling receiver is judged to be located in an out-range area, the controller 106 transmits an instruction signal F2 to the second detector 103 to thereby cause the second detector 103 to detect an electric field.

The second detector 103 detects an electric field of a radio frequency channel, and transmits the detection signal F1 representing an intensity of the detected electric field, to the controller 106.

The controller 106 reads data about frequency channels out of the memory 110. Then, if intensities of all frequency channels required to detect an intensity of an electric field are smaller than a threshold intensity, the controller 106 judges that the radio selective-calling receiver is located in the first area. Otherwise, the controller 106 judges that the radio selective-calling receiver is located in the second area. Herein, the threshold intensity is defined as an intensity smaller than an intensity of an electric field measured at a boundary between the in-range area and the out-range area.

Then, the controller 106 transmits a control signal I to the radio receiver 102 to thereby show the radio receiver 102 a frequency channel to be searched, and control activation of the radio receiver 102. That is, the controller 106 controls a power supply to turn on or off, and further controls an operation of the radio receiver 102.

The push switch 109 provides an external input to the controller 106 to thereby cause the controller 106 to judge whether the radio selective-calling receiver is located in the first area or the second area. The external input also includes an instruction as to whether frequency scanning operation and intermittent signal-receiving operation are turned on or off.

The controller 106 transmits a signal J indicating a result as to whether the above-mentioned operations are turned on or off, to thereby store the result in the memory 110.

Figure 2:
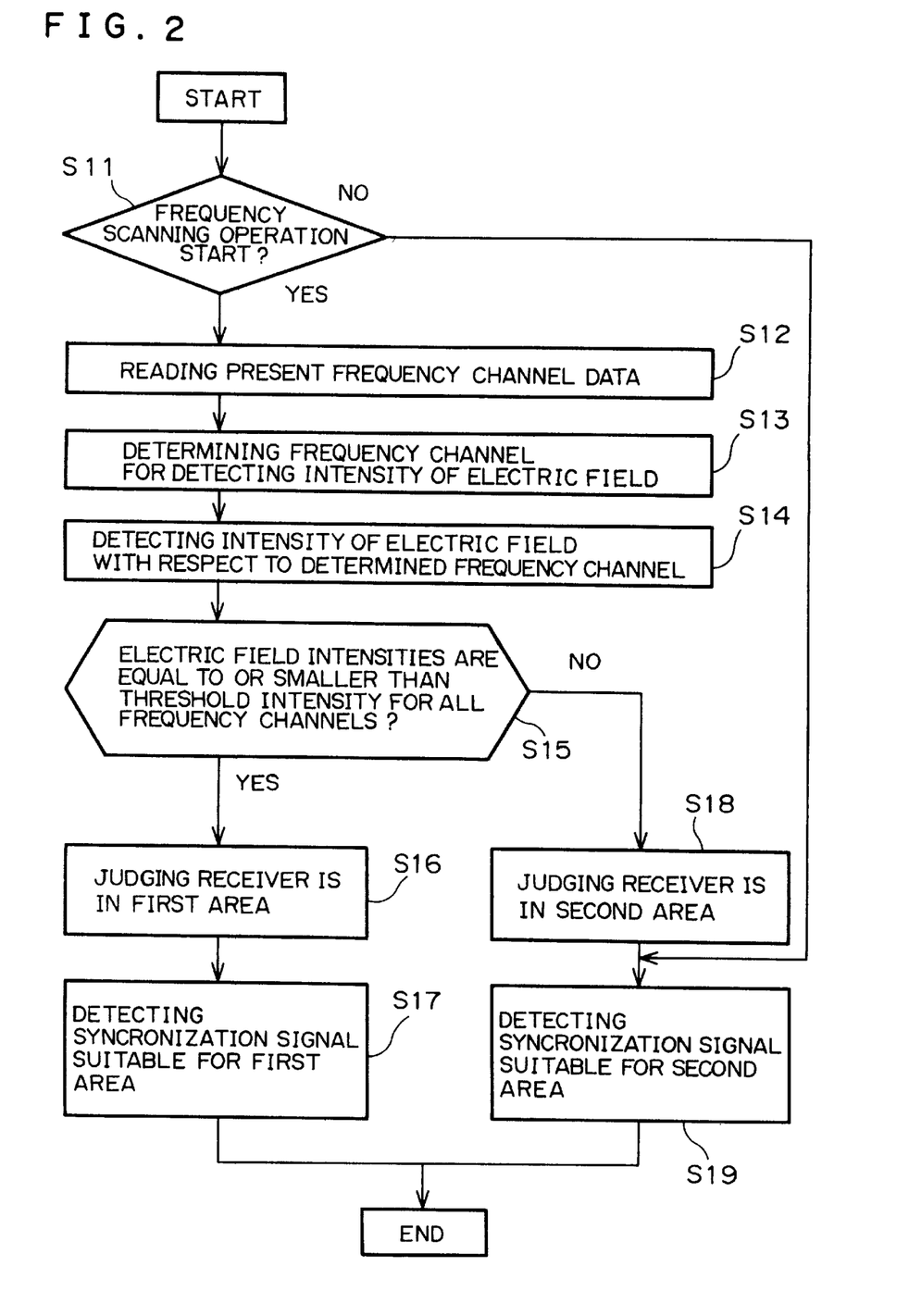
FIG. 2 is a flow chart showing an operation of the radio selective-calling receiver illustrated in FIG. 1, to be carried out after the radio selective-calling receiver is judged to be situated in an out-range area.

FIG. 2 is a flow chart showing an operation of the radio selective-calling receiver, to be conducted when the radio selective-calling receiver is judged to be located in the out-range area.

When the controller 106 judges that the radio selective-calling receiver is located in the out-range area, based on the location signal G transmitted from the monitor 108, the controller 106 reads the memory 110, and judges whether frequency scanning operation is to start, in step 11.

If the frequency scanning operation is not to start, the controller 106 controls the monitor 108 to search a synchronization signal with predetermined frequency channels being switched, in step 19.

If the frequency scanning operation is to start, the controller reads data about a present frequency channel out of the memory 110, in step 12. Then, the controller 106 determines a frequency channel required to detect an intensity of an electric field, based on all data about frequency channel stored in the memory 110, in step 13. Then, the controller 106 causes the second detector 103 to detect an intensity of an electric field with respect to the thus determined frequency channel, in step 14.

Then, the controller 106 checks if intensities of an electric field for all frequencies required to detect an intensity of an electric field are equal to or smaller than the threshold intensity, in step 15. If so, the controller 106 judges that the radio selective-calling receiver temporarily enters the first area, in step 16.

Then, the controller 106 causes the radio receiver 102 to search a synchronization signal suitable for the first area, in step 17.

If one of intensities of an electric field is equal to or greater than the threshold intensity, the controller 106 judges that the radio selective-calling receiver is located in the second area, in step 18.

Then, the controller 106 causes the radio receiver 102 to search a synchronization signal suitable for the second area, in step 19.

Figure 3:
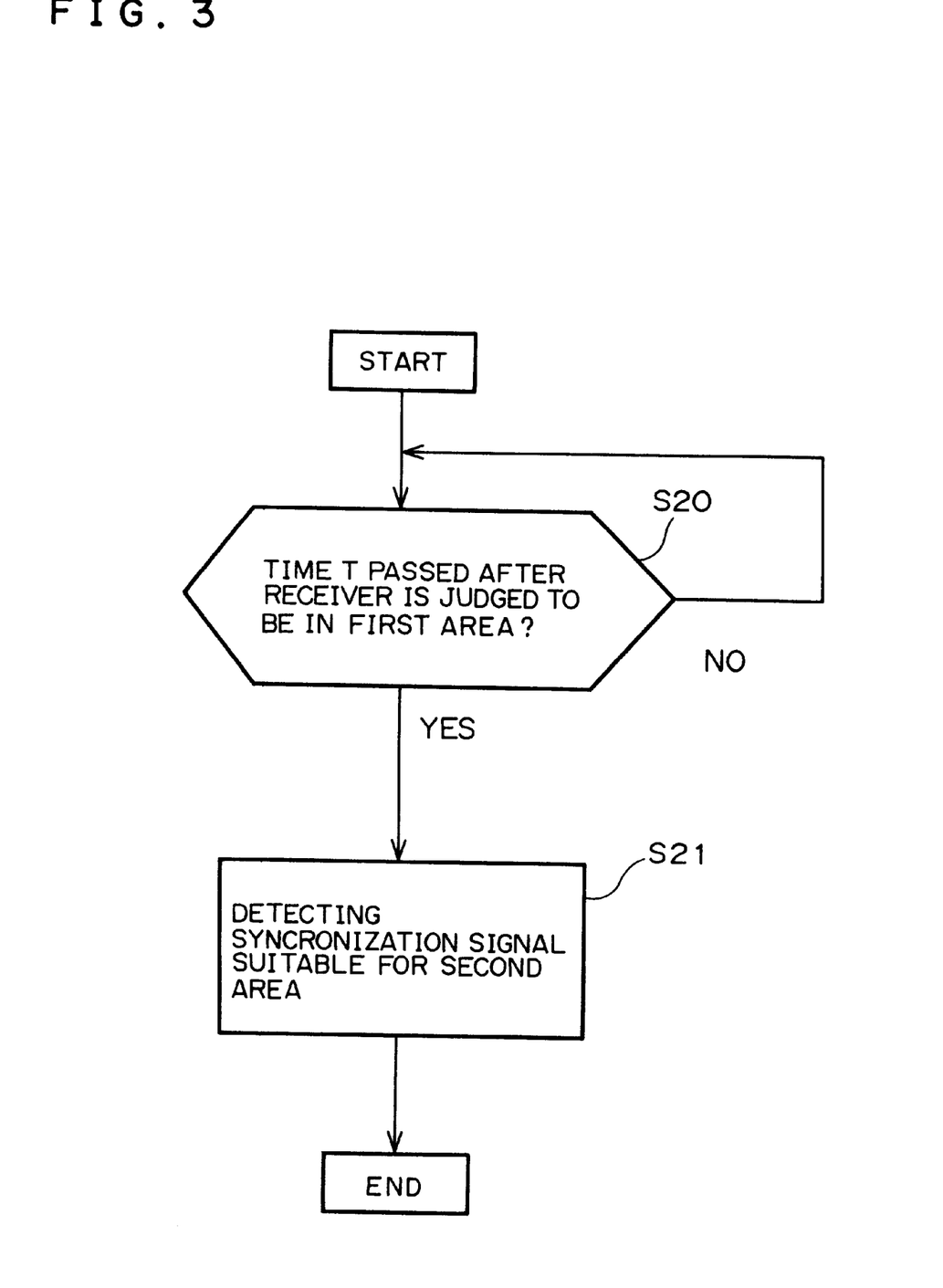
FIG. 3 is a flow chart showing an operation of the radio selective-calling receiver illustrated in FIG. 1, to be carried out after the radio selective-calling receiver transfers into an out-range area.

FIG. 3 is a flow chart of an operation to be carried out when a period of time T has passed after the radio selective-calling receiver transferred into the first area. The controller 106 checks whether a period of time T has passed after the radio selective-calling receiver was judged to be located in the first area, in step 20. If a period of time T has actually passed, an operation for searching a synchronization signal for the first area is ceased, and an ordinary operation for searching a synchronization for an out-range area starts, in step 21.

The radio selective-calling receiver in accordance with the above-mentioned first embodiment provides advantages as follows.

When radio selective-calling receiver transfers into an out-range area, the controller 106 causes the second detector 103 to detect electric field intensities with respect to a presently locked frequency channel and other frequency channels of surrounding areas around the radio selective-calling receiver. As a result, the radio selective-calling receiver can accurately judge whether the radio selective-calling receiver is in the first or second area, based on a state of an electric field at a place where the radio selective-calling receiver presently exists.

If intensities of an electric field for all frequencies are equal to or smaller than a threshold intensity, a synchronization signal is detected without switching frequency channels. If one of intensities of an electric field is greater than the threshold intensity, a synchronization signal is searched with predetermined frequency channels being switched and further with radio signals being received at an intermittent interval longer than an interval determined for battery saving.

As a result, it is possible to reduce power consumption during frequency scanning operation, and promptly establish synchronization when the radio selective-calling receiver transfers into an in-range area, by checking causes of transferring into an out-range area, based on an intensity of an electric field to be measured immediately after the radio selective-calling receiver transfers into an out-range area.

Second Embodiment

Figure 4:
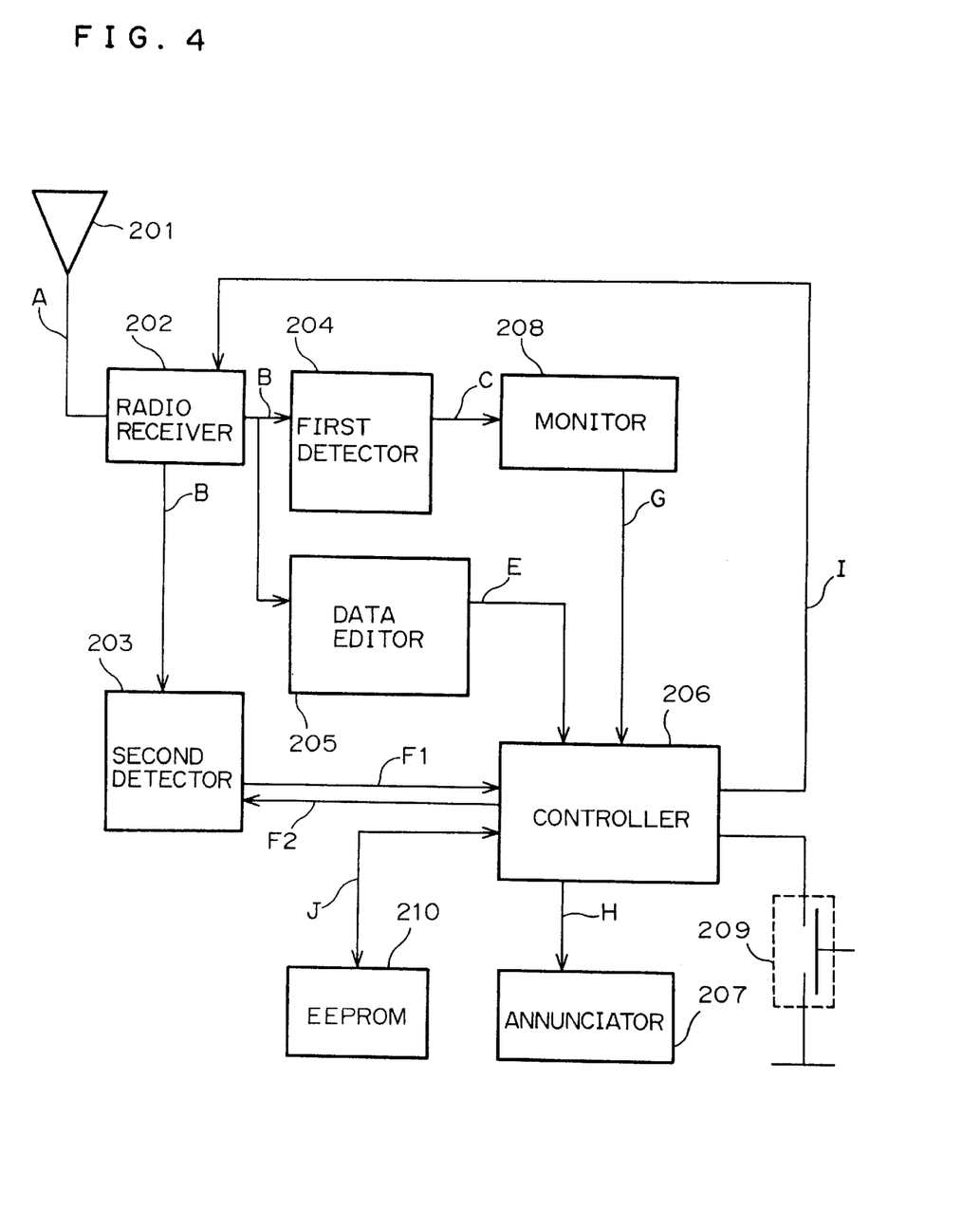
FIG. 4 is a block diagram of a radio selective-calling receiver in accordance with the second embodiment.

FIG. 4 is a block diagram of a radio selective-calling receiver in accordance with the second embodiment. The illustrated radio selective-calling receiver has the same structure as that of the radio selective-calling receiver illustrated in FIG. 1 except that the illustrated radio selective-calling receiver includes an electrically erasable and programmable read only memory (EEPROM) 210 in place of the memory 110. Elements 201 to 209 has the same structure as those of the elements 101 to 109 in the radio selective-calling receiver in accordance with the first embodiment, illustrated in FIG. 1.

A monitor 208 operates differently from the monitor 108 illustrated in FIG. 1. That is, the monitor 208 detects a synchronization signal, and transmits a controller 206 a location signal G indicating that the radio selective-calling receiver is located in an in-range area, if the synchronization signal is detected, or a location signal G indicating that the radio selective-calling receiver is located in an out-range area, if a synchronization signal is not detected N times in sequence. Herein, the numeral N is in advance stored in EEPROM 210, and is one of parameters for determining a period of time to be used when the radio selective-calling receiver is judged as to whether it is located in an out-range area.

Other operations are carried out in the same way as the first embodiment.

Figure 5:
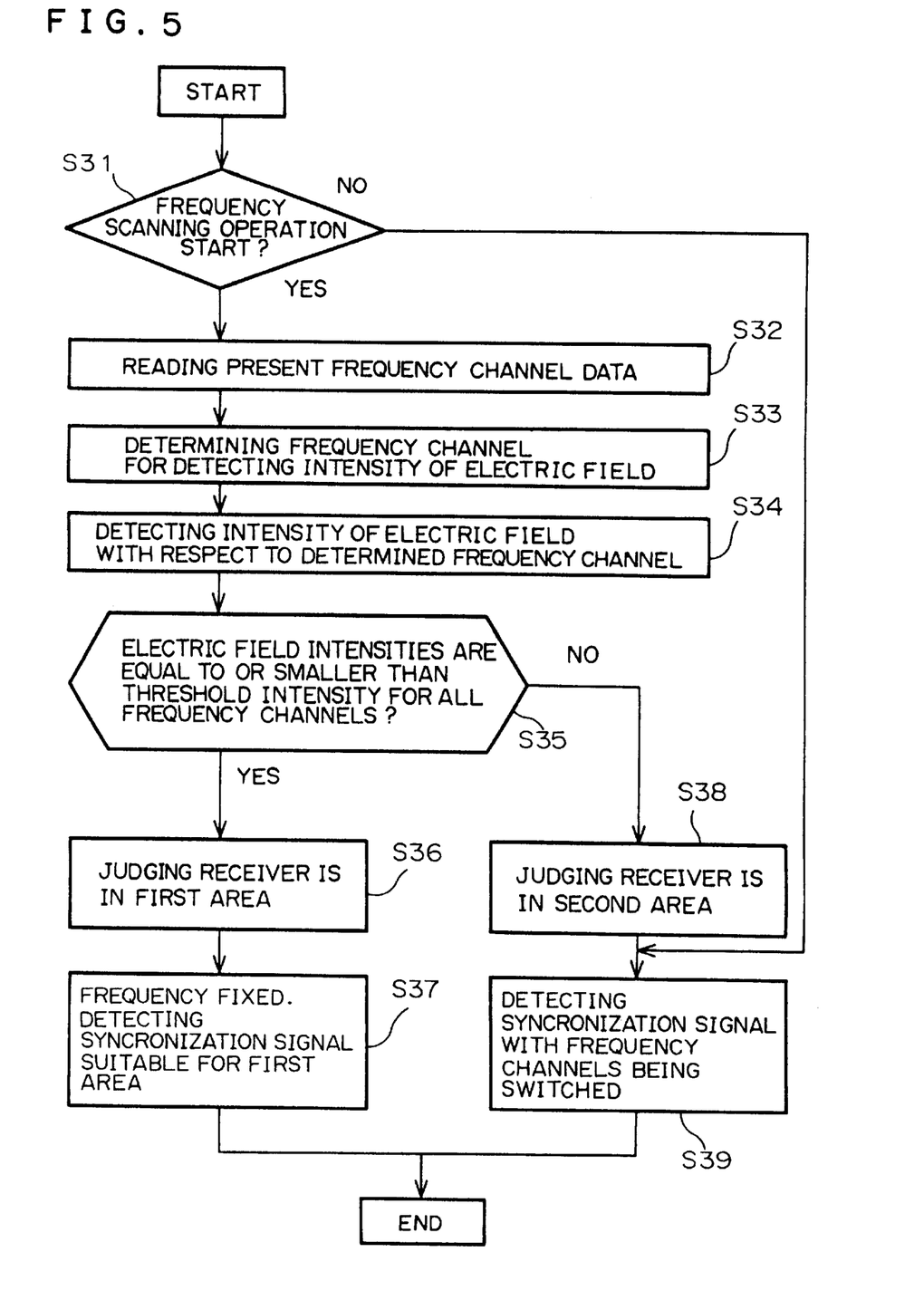
FIG. 5 is a flow chart showing an operation of the radio selective-calling receiver illustrated in FIG. 4, to be carried out after the radio selective-calling receiver is judged to be situated in an out-range area.

FIG. 5 is a flow chart showing an operation of the radio selective-calling receiver in accordance with the second embodiment, to be conducted when the radio selective-calling receiver is judged to be located in the out-range area.

The flow chart illustrated in FIG. 5 is different from the flow chart illustrated in FIG. 2 in steps 37 and 39. The other steps 31 to 36 and 38 correspond to the steps 16 and 18.

With reference to FIG. 5, a frequency channel to detect an electric field therefor is determined in step 33. This frequency channel corresponds to a present frequency channel and frequency channels associated with a service area around a service area associated with this frequency channel. It should be noted that those frequency channels are included in data about frequency channels to be searched on establishment of synchronization.

In step 37, a synchronization signal for the first area is detected. This means that a certain frequency channel is kept fixed, and a synchronization signal is intermittently detected at an interval smaller than an interval at which a synchronization signal is detected in the second area.

In step 39, a synchronization signal is detected in the second area with a plurality of frequency channels which the radio selective-calling receiver in advance has, including frequency channels having been rendered in the out-range area, being intermittently switched at a certain interval.

The radio selective-calling receiver in accordance with the second embodiment provides the same advantage as that of the first embodiment.

Third Embodiment

A radio selective-calling receiver in accordance with the third embodiment has the same structure as the structure of the radio selective-calling receiver in accordance with the second embodiment, but operates in a different manner from the second embodiment.

Figure 6:
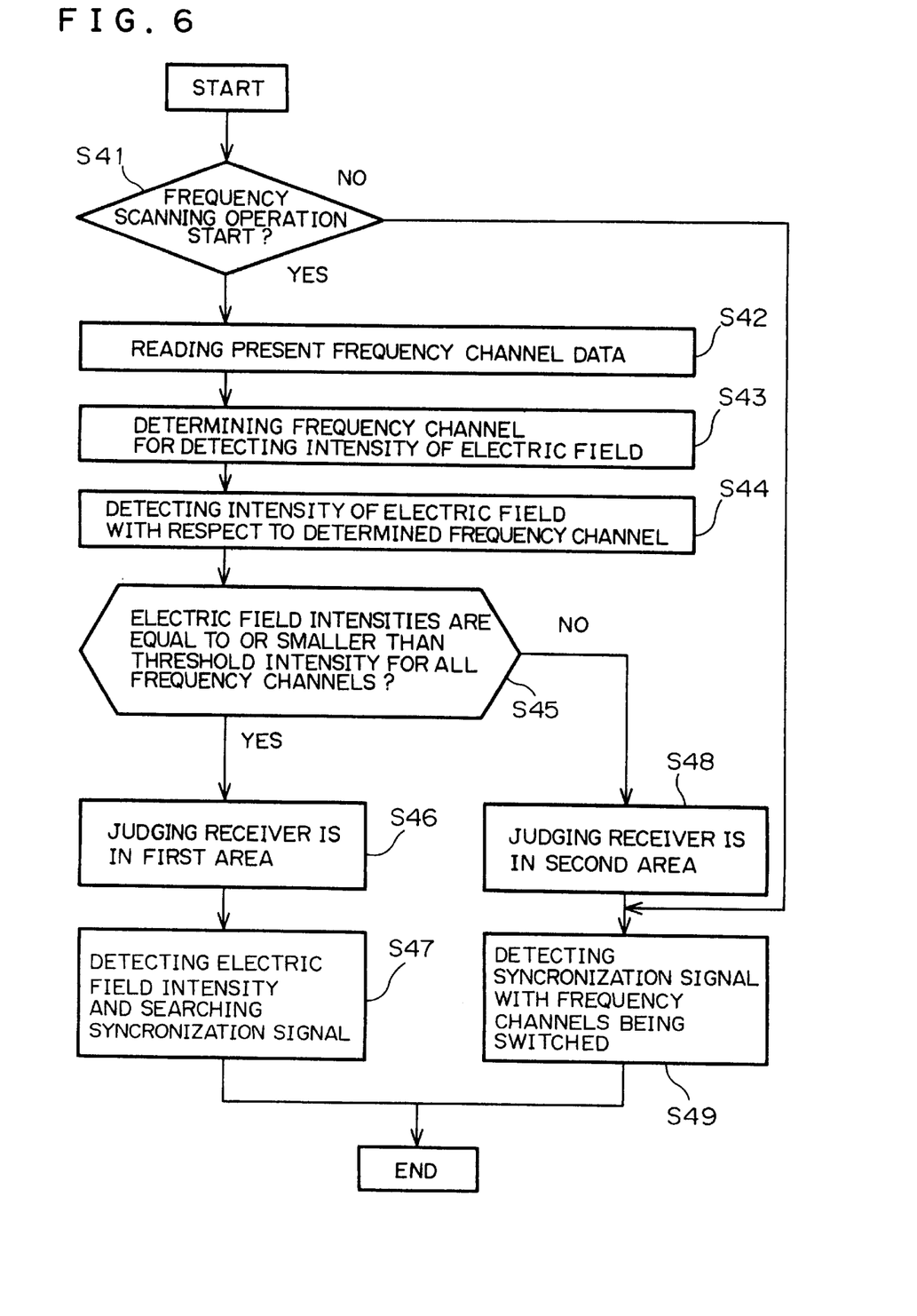
FIG. 6 is a flow chart showing an operation of a radio selective-calling receiver in accordance with the third embodiment, to be carried out after the radio selective-calling receiver is judged to be situated in an out-range area.

FIG. 6 is a flow chart showing an operation of the radio selective-calling receiver in accordance with the third embodiment. An operation of the radio selective-calling receiver in accordance with the third embodiment is comprised of the same steps as the steps of the operation of the second embodiment, illustrated in FIG. 5, except the step 47. In FIG. 6, the steps 41 to 46, 48, and 49 have the same content as the steps 31 to 36, 38, and 39, respectively.

In the step 37 in the second embodiment, a synchronization signal is detected at a fixed frequency at a battery saving interval different from an ordinary one. In the step 47 in the third embodiment, only detection of an intensity of an electric field is carried out prior to detection of a synchronization signal. That is, a synchronization signal is detected after an intensity of an electric field has been detected. A frequency channel for which an intensity of an electric field is to be detected may include a single frequency channel at which the radio selective-calling receiver transfers into an out-range area, or all of a plurality of frequency channels for each of which an intensity of an electric field has been detected.

The radio selective-calling receiver in accordance with the third embodiment provides the same advantage as that of the first embodiment.

Though a frequency channel for which an intensity of an electric field is to be detected includes a present frequency channel and frequency channels for surrounding areas around the radio selective-calling receiver in the above-mentioned embodiments, a frequency channel for which an intensity of an electric field is to be detected is not to be limited to them. A frequency channel for which an intensity of an electric field is to be detected may include all frequency channels which the radio selective-calling receiver has.

In the above-mentioned embodiments, a frequency channel is fixed when the radio selective-calling receiver is judged to be located in the first area. However, an interval at which a synchronization signal is intermittently detected may be varied.

In addition, an intensity of an electric field was used as an intensity of electro-magnetic wave in the above-mentioned embodiments. In place of an intensity of an electric field, there may be used an electric power density, for instance.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-317642 filed on Nov. 4, 1997 including specification, claims, drawings and summary is incorporated herein by reference in its entirety.

What is claimed is:

1. A method of judging whether a radio receiver is in a first area or a second area, said radio receiver dealing with a plurality of frequency channels, said method comprising the steps, in sequence, of:
    (a) receiving and demodulating radio signals;
    (b) detecting a synchronization signal out of the thus demodulated radio signals, and transmitting a first signal;
    (c) judging whether said radio receiver transfers outside a range where transmitted radio signals can be received, based on said first signal detected in said step (b);
    (d) detecting an intensity of electro-magnetic wave for each of said frequency channels, when said radio receiver is judged to transfer outside said range; and
    (e) judging that said radio receiver is situated in said first area, when all of intensities of electro-magnetic waves are equal to or smaller than a predetermined threshold value, and judging that said radio receiver is situated in said second area, when at least one of intensities of electro-magnetic waves is equal to or greater than said predetermined threshold value.

2. The method as set forth in claim 1, further comprising the step of (f) searching a synchronization signal suitable for said first area, when said radio receiver is judged to be situated in said first area in said step (e).

3. The method as set forth in claim 2, wherein said steps (e) and (f) are carried out on receiving an external input.

4. The method as set forth in claim 3, further comprising the step of storing said external input.

5. The method as set forth in claim 1, further comprising the step of (g) searching a synchronization signal suitable for said second area, when said radio receiver is judged to be situated in said second area in said step (e).

6. The method as set forth in claim 5, wherein said steps (e) and (g) are carried out on receiving an external input.

7. The method as set forth in claim 6, further comprising the step of storing said external input.

8. The method as set forth in claim 1, further comprising the steps of:
(h) storing data about said intensity of electro-magnetic wave; and
(i) judging whether said radio receiver is situated in said first area or said second area, and determining an operation of said radio receiver, based on said data.

9. A method of judging whether a radio receiver is in one of a first area and a second area, the radio receiver operable over a plurality of frequency channels, the method comprising the steps of, in sequence:
(a) receiving and demodulating radio signals;
(b) detecting a synchronization signal within said demodulated radio signals, and transmitting a first signal;
(c) judging whether the radio receiver transfers outside a range where transmitted radio signals can be received, based on said first signal detected in said step (b);
(d) detecting an intensity of electro-magnetic wave for each of the frequency channels when the radio receiver is judged to transfer outside said range; and
(e) judging that the radio receiver is situated in said first area, when all of intensities of electro-magnetic waves are not greater than a predetermined threshold value and judging that said radio receiver is situated in said second area, when at least one of intensities of electro-magnetic waves is not less than said predetermined threshold value wherein said first area is an area to which radio is interrupted to enter, and said second area is an area other than an area where the transmitted radio signal can be received.

10. The method as set forth in claim 2, wherein said radio receiver is judged to be situated within said range, when said synchronization signal is detected, and is judged to be situated outside said range, when said synchronization signal is not detected successively a predetermined number of times.

11. The method as set forth in claim 2, wherein said radio receiver is judged to be situated within said range, when said synchronization signal is detected, and is judged to be situated outside said range, when said synchronization signal is not detected by a predetermined period of time.

12. The method as set forth in claim 2, wherein said plurality of frequency channels are changed or determined in dependence on frequency channels obtained when said radio receiver transfers outside said range.

13. A method of judging whether a radio receiver is in one of a first area and a second area, the radio receiver operable over a plurality of frequency channels, said method comprising the steps, in sequence, of:
(a) receiving and demodulating radio signals;
(b) detecting a synchronization signal within said demodulated radio signals, and transmitting a first signal;
(c) judging whether the radio receiver transfers outside a range where transmitted radio signals can be received, based on said first signal detected in said step (b);
(d) detecting an intensity of an electro-magnetic wave for each of said frequency channels, when the radio receiver is judged to transfer outside said range; and
(e) judging that the radio receiver is situated in said first area, when all of intensities of electro-magnetic waves are not greater than a predetermined threshold value, and judging that the radio receiver is situated in said second area when at least one of intensities of electro-magnetic waves is not less than said predetermined threshold value; and searching a synchronization signal suitable for said second area, when said radio receiver is judged to be situated in said second area in said step (e)
wherein said synchronization signal is searched with predetermined frequency channels being switched and further with radio signals being received at an interval longer than an interval determined for battery saving.

14. A method of judging whether a radio receiver is in a first area or a second area, said radio receiver dealing with a plurality of frequency channels, said method comprising the steps, in sequence, of:
(a) receiving and demodulating radio signals;
(b) detecting a synchronization signal out of the thus demodulated radio signals, and transmitting a first signal;
(c) judging whether said radio receiver transfers outside a range where transmitted radio signals can be received, based on said first signal detected in said step (b);
(d) detecting an intensity of electro-magnetic wave for each of said frequency channels, when said radio receiver is judged to transfer outside said range;
(e) judging that said radio receiver is situated in said first area, when all of intensities of electro-magnetic waves are equal to or smaller than a predetermined threshold value, and judging that said radio receiver is situated in said second area, when at least one of intensities of electro-magnetic waves is equal to or greater than said predetermined threshold value;
(f) detecting an intensity of electro-magnetic wave; and
(g) searching a synchronization signal suitable for said first or second area, when said radio receiver is judged to be situated in said first or second area in said step (e).

15. The method as set forth in claim 14, wherein said first area is an area to which radio is interrupted to enter, and said second area is an area other than a service area where transmitted radio signal can be received.

16. The method as set forth in claim 14, wherein said synchronization signal is searched with predetermined frequency channels being switched and further with radio signals being received at an interval longer than an interval determined for battery saving.

17. The method as set forth in claim 14, wherein said steps (e) and (g) are carried out on receiving an external input.

18. The method as set forth in claim 17, further comprising the step of storing said external input.

19. The method as set forth in claim 17, wherein said radio receiver is judged to be situated within said range, when said synchronization signal is detected, and is judged to be situated outside said range, when said synchronization signal is not detected successively a predetermined number of times.

20. The method as set forth in claim 17, herein said radio receiver is judged to be situated within said range, when said synchronization signal is detected, and is judged to be situated outside said range, when said synchronization signal is not detected by a predetermined period of time.

21. The method as set forth in claim 14, further comprising the steps of:
(h) storing data about said intensity of electro-magnetic wave; and
(i) judging whether said radio receiver is situated in said first area or said second area, and determining an operation of said radio receiver, based on said data.

22. The method as set forth in claim 14, wherein said plurality of frequency channels are changed or determined independence on frequency channels obtained when said radio receiver transfers outside said range.

23. A circuit for judging whether a radio receiver is in a first area or a second area, said radio receiver dealing with a plurality of frequency channels, said circuit comprising:

(a) a radio receiver for receiving and demodulating radio signals;
(b) a first detector for detecting a synchronization signal out of the thus demodulated radio signals, and transmitting a first signal;
(c) a monitor for judging whether said radio receiver transfers outside a range where transmitted radio signals can be received, based on said first signal transmitted from said first detector;
(d) a second detector for detecting an intensity of electro-magnetic wave for each of said frequency channels, when said radio receiver is judged to transfer outside said range; and
(e) a controller for judging that said radio receiver is situated in said first area, when all of intensities of electro-magnetic waves are equal to or smaller than a predetermined threshold value, and judging that said radio receiver is situated in said second area, when at least one of intensities of electro-magnetic waves is equal to or greater than said predetermined threshold value.

24. The circuit as set forth in claim 23, wherein said radio receiver searches a synchronization signal suitable for said first area, when said radio receiver is judged to be situated in said first area.

25. The circuit as set forth in claim 23, wherein said receiver searches a synchronization signal suitable for said second area, when said radio receiver is judged to be situated in said second area.

26. The circuit as set forth in claim 23, further comprising a switch for providing an external input to said radio receiver for causing said radio receiver to judge whether said radio receiver is in said first or second area.

27. The circuit as set forth in claim 23, further comprising a memory for storing data about an intensity of electro-magnetic wave, transmitted from said second detector, and wherein said controller judges whether said radio receiver is situated in said first area or said second area, and determining an operation of said radio receiver, based on said data.

28. The circuit as set forth in claim 27, wherein said memory is an electrically erasable programmable read only memory (EEPROM).

29. A circuit for judging whether a radio receiver is in one of a first area and a second area, said radio receiver operable over a plurality of frequency channels, said circuit comprising:
(a) a radio receiver for receiving and demodulating radio signals;
(b) a first detector for detecting a synchronization signal within said demodulated radio signals, and transmitting a first signal:
(c) a monitor for judging whether the radio receiver transfers outside a range where transmitted radio signals can be received, based on said first signal transmitted from the first detector;
(d) a second detector for detecting an intensity of electro-magnetic wave for each of said frequency channels, when the radio receiver is judged to transfer outside said range;
(e) a controller for judging that the radio receiver is situated in said first area, when all of intensities of electro-magnetic waves are not greater than a predetermined threshold value and judging that the radio receiver is situated in said second area, when at least one of intensities of electro-magnetic waves is not less than said predetermined threshold value;
wherein said first area is an area to which radio is interrupted to enter, and said second area is an area other than a service area where a transmitted radio signal can be received.

30. The circuit as set forth in claim 24, wherein said monitor judges that said radio receiver is situated within said range, when said synchronization signal is detected, and that said radio receiver is situated outside said range, when said synchronization signal is not detected successively a predetermined number of times.

31. The circuit as set forth in claim 24, wherein said monitor judges that said radio receiver is situated within said range, when said synchronization signal is detected, and that said radio receiver is situated outside said range, when said synchronization signal is not detected by a predetermined period of time.

32. The circuit as set forth in claim 24, wherein said plurality of frequency channels are changed or determined in dependence on frequency channels obtained when said radio receiver transfers outside said range.

33. A circuit for judging whether a radio receiver is in one of a first area and a second area, said radio receiver operable over a plurality of frequency channels, the circuit comprising:
(a) a radio receiver for receiving and demodulating radio signals and searching for a synchronization signal suitable for the second area when the receiver is judged to be in the second area;
(b) a first detector for detecting a synchronization signal within said demodulated radio signals, and transmitting a first signal;
(c) a monitor for judging whether the radio receiver transfers outside a range where transmitted radio signals can be received, based on said first signal transmitted from the first detector;
(d) a second detector for detecting an intensity of electro-magnetic wave for each of said frequency channels, when the radio receiver is judged to transfer outside said range; and
(e) a controller for judging that the radio receiver is situated in said first area, when all of intensities of electro-magnetic waves are not greater than a predetermined threshold value, and judging that the radio receiver is situated in said second area when at least one of intensities of electro-magnetic waves is not less than the predetermined threshold value;
wherein the radio receiver searches said synchronization signal with predetermined frequency channels being switched and further with radio signals being received at an interval longer than an interval determined for battery savings.

34. A radio selective-calling receiver dealing with a plurality of frequency channels, comprising a circuit for judging whether said radio selective-calling receiver is in a first area or a second area, said circuit comprising:
(a) a radio receiver for receiving and demodulating radio signals;
(b) a first detector for detecting a synchronization signal out of the thus demodulated radio signals, and transmitting a first signal;
(c) a monitor for judging whether said radio receiver transfers outside a range where transmitted radio signals can be received, based on said first signal transmitted from said first detector;
(d) a second detector for detecting an intensity of electro-magnetic wave for each of said frequency channels, when said radio receiver is judged to transfer outside said range; and
(e) a controller for judging that said radio receiver is situated in said first area, when all of intensities of electro-magnetic waves are equal to or smaller than a predetermined threshold value, and judging that said radio receiver is situated in said second area, when at least one of intensities of electro-magnetic waves is equal to or greater than said predetermined threshold value.

35. The radio selective-calling receiver as set forth in claim 34, wherein said radio receiver searches a synchronization signal suitable for said first area, when said radio receiver is judged to be situated in said first area.

36. The radio selective-calling receiver as set forth in claim 34, wherein said receiver searches a synchronization signal suitable for said second area, when said radio receiver is judged to be situated in said second area.

37. The radio selective-calling receiver as set forth in claim 34, further comprising a switch for providing an external input to said radio receiver for causing said radio receiver to judge whether said radio receiver is in said first or second area.

38. The radio selective-calling receiver as set forth in claim 34, further comprising a memory for storing data about an intensity of electro-magnetic wave, transmitted from said second detector, and wherein said controller judges whether said radio receiver is situated in said first area or said second area, and determining an operation of said radio receiver, based on said data.

39. The radio selective-calling receiver as set forth in claim 37, wherein said memory is an electrically erasable programmable read only memory (EEPROM).

40. A radio selective-calling receiver operable over with a plurality of frequency channels, comprising a circuit for judging whether said radio selective-calling receiver is in one of a first area and a second area, said circuit comprising:
    (a) a radio receiver for receiving and demodulating radio signals;
    (b) a first detector for detecting a synchronization signal within said demodulated radio signals, and transmitting a first signal;
    (c) a monitor for judging whether the radio receiver transfers outside a range where transmitted radio signals can be received, based on the first signal transmitted from the first detector;
    (d) a second detector for detecting an intensity of electro-magnetic wave for each of said frequency channels, when the radio receiver is judged to transfer outside said range; and
    (e) a controller for judging that the radio receiver is situated in said first area, when all of intensities of electro-magnetic waves are not greater than a predetermined threshold value, and judging that said radio receiver is situated in said second area when at least one of intensities of electro-magnetic waves is not less than said predetermined threshold value;
    wherein said first area is an area to which radio is interrupted to enter, and said second area is an area other than a service area where transmitted radio signal can be received.

41. The radio selective-calling receiver as set forth in claim 35, wherein said monitor judges that said radio receiver is situated within said range, when said synchronization signal is detected, and that said radio receiver is situated outside said range, when said synchronization signal is not detected successively a predetermined number of times.

42. The radio selective-calling receiver as set forth in claim 35, wherein said monitor judges that said radio receiver is situated within said range, when said synchronization signal is detected, and that said radio receiver is situated outside said range, when said synchronization signal is not detected by a predetermined period of time.

43. The radio selective-calling receiver as set forth in claim 35, wherein said plurality of frequency channels are changed or determined in dependence on frequency channels obtained when said radio receiver transfers outside said range.

44. A radio selective-calling receiver operable over a plurality of frequency channels, comprising a circuit for judging whether the radio selective-calling receiver is in one of a first area and a second area, the circuit comprising:
    (a) a radio receiver for receiving and demodulating radio signals and searching for a synchronization signal suitable for the second area when the radio receiver is judged to be in the second area;
    (b) a first detector for detecting a synchronization signal within said demodulated radio signals, and transmitting a first signal;
    (c) a monitor for judging whether the radio receiver transfers outside a range where transmitted radio signals can be received, based on said first signal transmitted from said first detector;
    (d) a second detector for detecting an intensity of electro-magnetic wave for each of said frequency channels when the radio receiver is judged to transfer outside said range; and
    (e) a controller for judging that the radio receiver is situated in said first area, when all of intensities of electro-magnetic waves are not greater than a predetermined threshold value, and judging that the radio receiver is situated in said second area, when at least one of intensities of electro-magnetic waves is not less than said predetermined threshold value;
    wherein the radio receiver searches said synchronization signal with predetermined frequency channels being switched and further with radio signals being received at an interval longer than an interval determined for battery saving.

* * * * *